United States Patent
Corrie et al.

(10) Patent No.: US 12,281,751 B2
(45) Date of Patent: Apr. 22, 2025

(54) ACCESSORY SUPPORT BRACKET

(71) Applicant: Colebrook Bosson & Saunders (Products) Limited, London (GB)

(72) Inventors: Alex James Corrie, London (GB); Jack Thomas Fearnley, Wakefield (GB)

(73) Assignee: Colebrook Bosson & Saunders (Products) Limited, London (GB)

( * ) Notice: Subject to any disclaimer, the term of this patent is extended or adjusted under 35 U.S.C. 154(b) by 90 days.

(21) Appl. No.: 18/177,622

(22) Filed: Mar. 2, 2023

(65) Prior Publication Data

US 2024/0295289 A1 Sep. 5, 2024

(51) Int. Cl.
*A47B 96/06* (2006.01)
*A47B 97/00* (2006.01)
(Continued)

(52) U.S. Cl.
CPC ........... *F16M 13/022* (2013.01); *A47B 97/00* (2013.01); *F16B 2/18* (2013.01); *A47B 2097/003* (2013.01);
(Continued)

(58) Field of Classification Search
CPC .............................. F16M 13/022; A47B 97/00; A47B 2097/003; A47B 2200/0081; A47B 2200/0085; F16B 2/18
See application file for complete search history.

(56) References Cited

U.S. PATENT DOCUMENTS

| | | | | |
|---|---|---|---|---|
| 1,349,225 A | * | 8/1920 | Rosenblum | A41H 15/00 269/215 |
| 5,584,457 A | * | 12/1996 | Fawcett | F21V 23/04 362/802 |

(Continued)

FOREIGN PATENT DOCUMENTS

| | | |
|---|---|---|
| CN | 213333540 A | 6/2021 |
| CN | 115307033 A | 11/2022 |
| WO | 2014153183 A1 | 9/2014 |

OTHER PUBLICATIONS

Gogoi, "7 Best Under Desk Cable Management Accessories," <https://www.guidingtech.com/best-under-desk-cable-management-accessories/> article published Nov. 10, 2020 and updated Feb. 2, 2022 (13 pages).

(Continued)

*Primary Examiner* — Amy J. Sterling
(74) *Attorney, Agent, or Firm* — Michael Best & Friedrich LLP

(57) ABSTRACT

A bracket configured to selectively couple an accessory to a piece of furniture, where the bracket includes a backing plate including a pair of longitudinally extending opposed side rails and a rack having a plurality of teeth, the teeth extending between the pair of opposed side rails. A stationary clamping platform is fixedly coupled to the backing plate, where the accessory is supported by the stationary clamping platform. A moveable clamping platform has a clamping surface oriented parallel to the clamping surface of the stationary clamping platform, where the moveable clamping platform is coupled to the opposed side rails to be selectively moveable along the backplate. A locking mechanism is supported by the moveable clamping platform and is rotatable relative to the moveable clamping platform, where the locking mechanism includes a plurality of teeth configured to selectively meshingly engage with the rack.

19 Claims, 9 Drawing Sheets

(51) Int. Cl.
*F16B 2/18* (2006.01)
*F16M 13/02* (2006.01)

(52) U.S. Cl.
CPC .................. *A47B 2200/0081* (2013.01); *A47B 2200/0085* (2013.01)

(56) References Cited

U.S. PATENT DOCUMENTS

| | | | |
|---|---|---|---|
| 5,975,472 A * | 11/1999 | Hung | F16M 13/022 |
| | | | 248/278.1 |
| 5,996,957 A * | 12/1999 | Kurtz | A47G 23/0225 |
| | | | 248/231.21 |
| 6,607,169 B1 | 8/2003 | Gershfeld | |
| 6,971,911 B2 | 12/2005 | Ramsey et al. | |
| 7,083,421 B1 | 8/2006 | Mori | |
| 8,500,076 B2 * | 8/2013 | Lai | B62B 9/26 |
| | | | 248/102 |
| 9,399,479 B1 * | 7/2016 | Chen | F16M 13/022 |
| 10,253,926 B1 * | 4/2019 | Fan | F21V 21/096 |
| 10,852,797 B2 | 12/2020 | Volek et al. | |
| 10,932,601 B1 * | 3/2021 | Fan | F16M 13/02 |
| 11,131,332 B2 * | 9/2021 | Huang | F16B 2/065 |
| 11,754,217 B2 * | 9/2023 | Leman | F16M 13/022 |
| | | | 248/442.2 |
| 2007/0040082 A1 | 2/2007 | Nien | |
| 2013/0074294 A1 * | 3/2013 | Lynch | A47G 21/167 |
| | | | 24/535 |
| 2018/0217636 A1 | 8/2018 | McNamara | |
| 2018/0287322 A1 | 10/2018 | Hayes et al. | |
| 2024/0175542 A1 * | 5/2024 | Yao | F16M 11/041 |
| 2024/0218955 A1 * | 7/2024 | Deng | F16M 11/14 |

OTHER PUBLICATIONS

StarTech, "Power Strip Desk Mount," <https://www.startech.com/en-us/display-mounting-ergonomics/pwrstrpclmp> web page visited May 9, 2023 (3 pages).

European Patent Office Extended Search Report for Application No. 24160833.0 dated Oct. 30, 2024 (8 pages).

* cited by examiner

ACCESSORY SUPPORT BRACKET

FIELD OF THE DISCLOSURE

The present disclosure relates to a bracket for supporting office components relative to office furniture, and more particularly to supporting electronic office components relative to an office desk.

SUMMARY

In one aspect the present disclosure provides a bracket configured to selectively couple an accessory to a piece of furniture, where the bracket includes a holder configured to support the accessory, and a clamp supporting the holder and configured to couple the accessory to the piece of furniture. The clamp includes a backing plate including a rack having a plurality of teeth, a stationary clamping platform extending transverse to the backing plate, a moveable clamping platform coupled to the backing plate, the moveable clamping platform oriented transverse to the backing plate and moveable along the backing plate, and a locking mechanism operably coupled to the moveable clamping platform. The locking mechanism includes a plurality of teeth configured to selectively meshingly engage with the teeth on the rack of the backing plate, where the locking mechanism is rotatable between a lock position, in which the gear teeth of the locking mechanism are engaged with the rack, and an unlock position, in which the gear teeth of the locking mechanism are disengaged from the rack.

In another aspect present disclosure provides a bracket configured to selectively couple an accessory to a piece of furniture, where the bracket includes a backing plate having a rack extending along a longitudinal direction of the backing plate, where the rack includes a plurality of teeth. A stationary clamping platform extends from a first end of the backing plate in a direction transverse to the longitudinal direction of the backing plate, and a moveable clamping platform is oriented parallel to the stationary clamping platform. The moveable clamping platform is coupled to the backing plate and is selectively moveable along the longitudinal direction of the backing plate, where the moveable clamping platform includes a moveable clamping surface and a slide support. A locking mechanism includes a worm positioned between the moveable clamping surface and the slide support. The worm includes a plurality of teeth selectively engagable with the plurality of teeth on the rack. The locking mechanism is rotatable between a locked position, which inhibits movement of the moveable clamping platform relative to the backing plate, and an unlocked position, in which the moveable clamping platform is freely moveable relative to the backing plate.

In yet another aspect present disclosure provides a bracket configured to selectively couple an accessory to a piece of furniture, where the bracket includes a backing plate including a pair of longitudinally extending opposed side rails and a rack having a plurality of teeth, the teeth extending between the pair of opposed side rails. A stationary clamping platform is fixedly coupled to the backing plate, where the accessory is supported by the stationary clamping platform. A moveable clamping platform has a clamping surface oriented parallel to the clamping surface of the stationary clamping platform, where the moveable clamping platform is coupled to the opposed side rails to be selectively moveable along the backplate. A locking mechanism is supported by the moveable clamping platform and is rotatable relative to the moveable clamping platform, where the locking mechanism includes a plurality of teeth configured to selectively meshingly engage with the rack.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
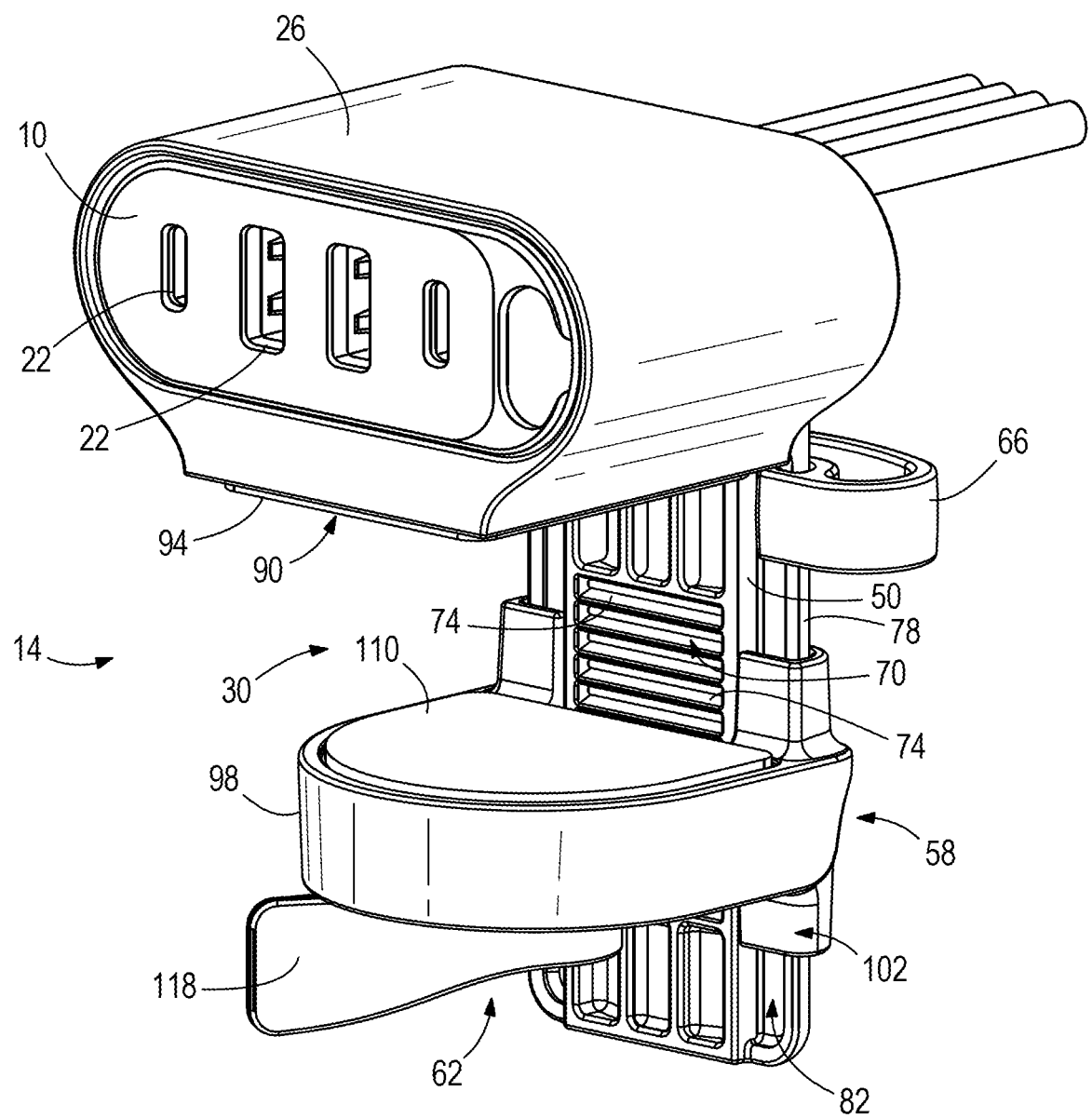
FIG. 1 is a perspective view of a bracket for an accessory.
Figure 2:
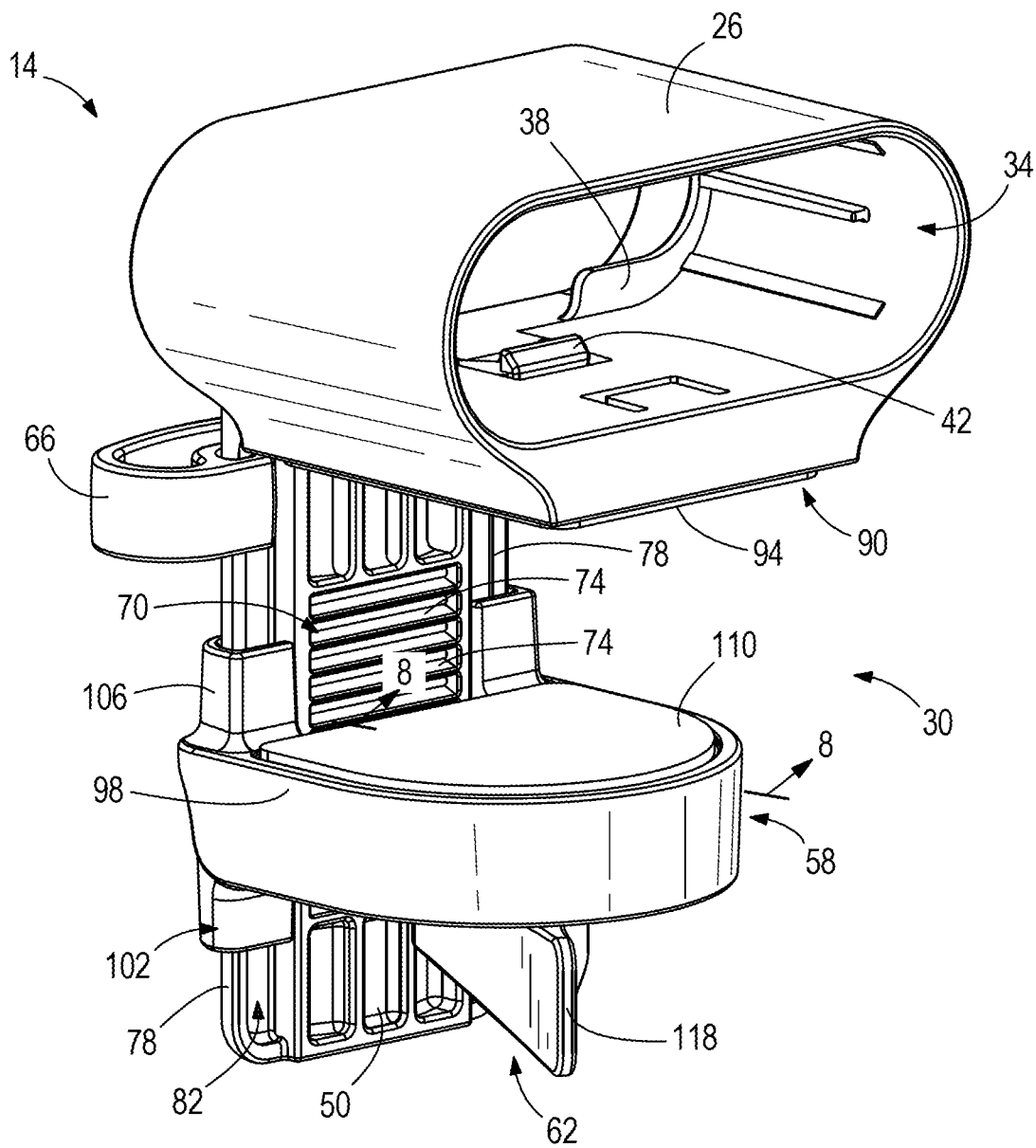
FIG. 2 is a second perspective view of the bracket of FIG. 1, with the connectivity module hidden for clarity.
Figure 3:
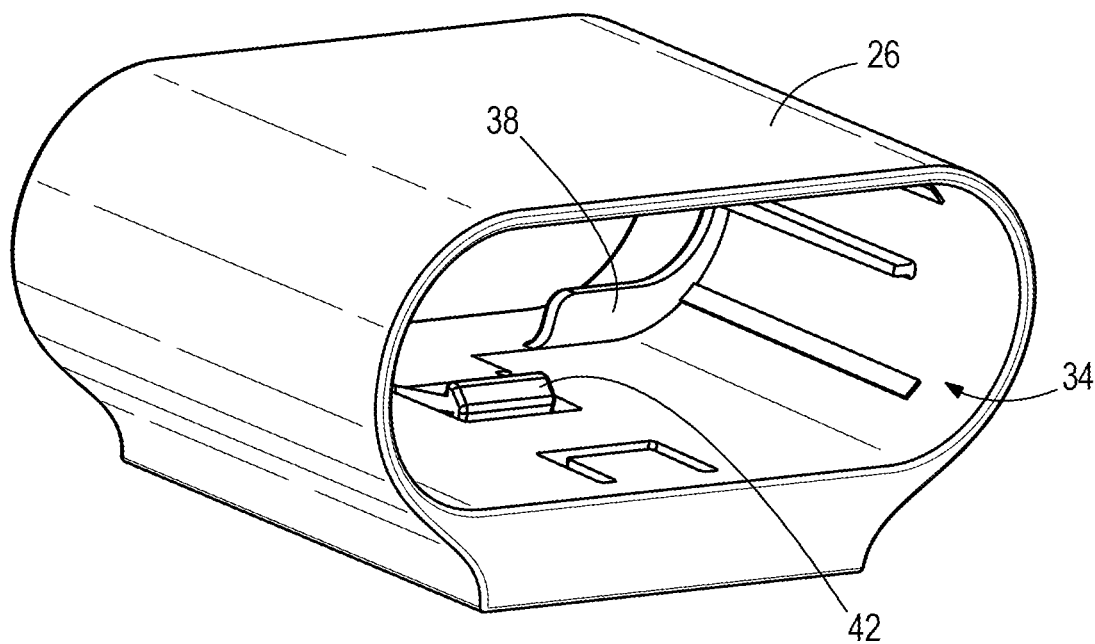
FIG. 3 is first a perspective view of a holding portion of the bracket of FIG. 1.
Figure 10:
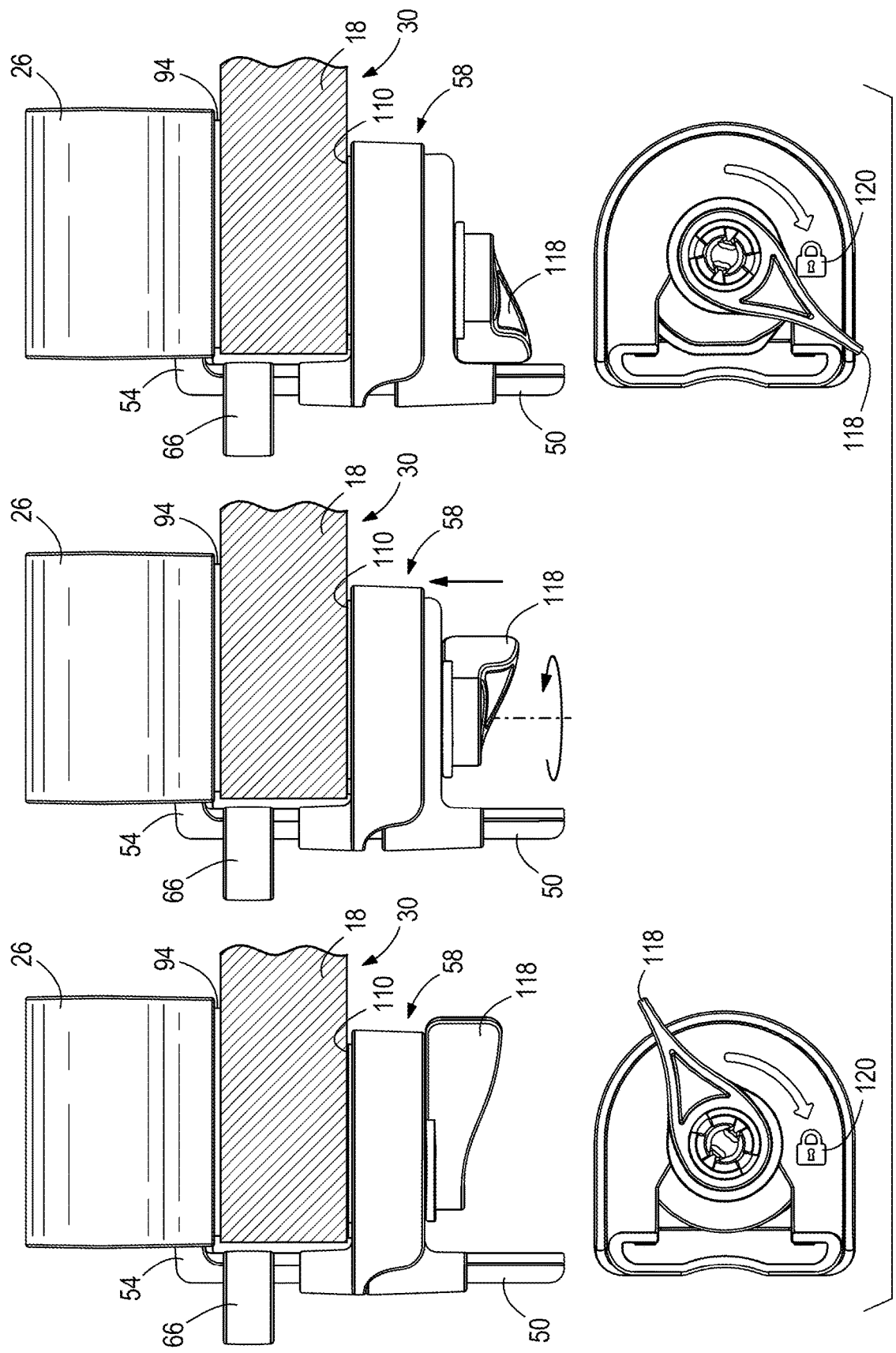
FIG. 10 is a stepwise illustration of clamping the bracket to a desk.

FIG. 1 illustrates a mounting bracket 14 for coupling an accessory 10 to a piece of office furniture, such as a desk 18 (FIG. 10). In the present disclosure, the accessory 10 is illustrated as a connectivity module 10 and will be described as such. However, it should be understood that in other embodiments the accessory 10 may not be a connectivity module 10, but rather, may be other types of accessories 10 capable of being supported by the mounting bracket 14. For example, the accessory 10 may include holders for a smart device, a pencil holder, a small shelf, a light, a speaker, etc.

The illustrated connectivity module 10 includes a plurality of connection ports 22 for electrically coupling office electronics (not shown), such as a computer monitor and a keyboard to a computer. For example, the connection ports 22 may include a charging port, a USB port, or other ports for providing power, data, audio, video, wifi, Bluetooth, or other connectivity. The connection port 10 may be removeable coupled to the bracket 14 and interchangeable with other accessories 10.

With reference to FIGS. 1-4, the bracket 14 includes a holder 26 that supports the connectivity module 10 and a clamp 30 that is selectively coupled to the holder 26. The holder 26 selectively receives the connectivity module 10 within an aperture 34. In the illustrated embodiment, the connectivity module 10 is generally oval-shaped in cross-section, and the aperture 34 has a corresponding shape. The aperture 34 extends through the holder 26 and includes a stop wall 38 and securement hook 42. The stop wall 38 prevents the connectivity module 10 from passing through the aperture 34 in a first direction, and the securement hook 42 engages the connectivity module 10 to prevent the connectivity module 10 from being removed from the aperture 34. A user may remove the connectivity module 10 by releasing the securement hook 42 and allowing the connectivity module 10 to slide out of the aperture 34. A different connectivity module 10 or another accessory may be inserted into the aperture 34 instead.

Figure 4:
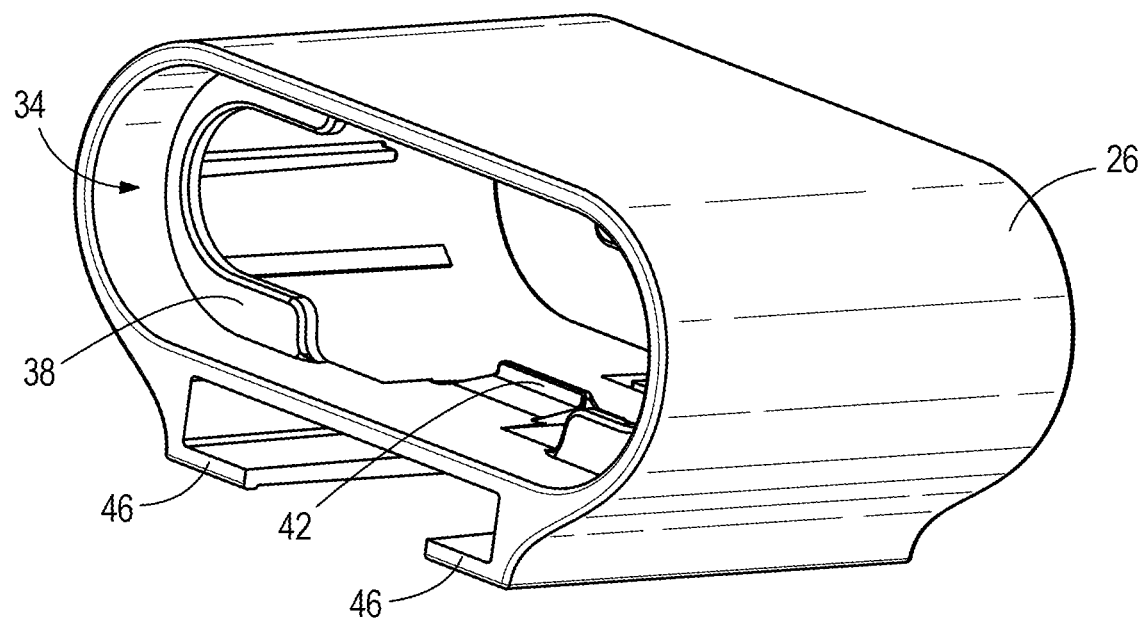
FIG. 4 is a second perspective view of the holding portion of FIG. 3.

Referring now to FIG. 4, the holder 26 includes attachment wings 46 that surround a portion of the clamp 30 to secure the holder 26 to the clamp 30. In the illustrated embodiment, the attachment wings 46 engage the clamp 30 with an interference fit. In other embodiments the holder 26 may take different shapes to support different types of connectivity modules 10. Furthermore, in other embodiments, the holder 26 may be coupled to the clamp 30 in ways other than an interference fit or may be integrally formed with the clamp 30.

Figure 5:
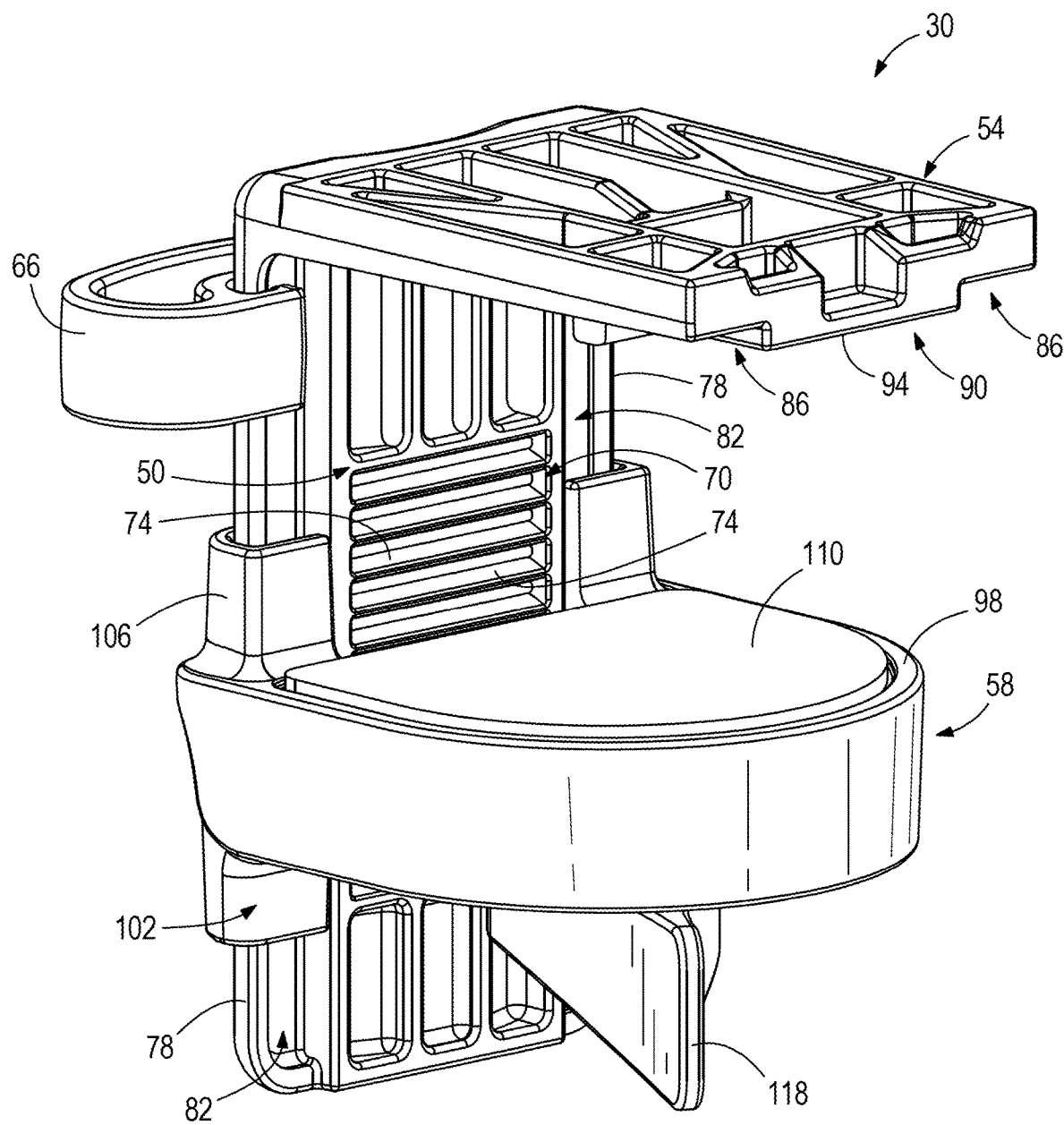
FIG. 5 is a perspective view of a clamping portion of the bracket of FIG. 1.

With reference to FIG. 5, the clamp 30 is adjustable to selectively secure the bracket 14 to the desk 18. In the illustrated embodiment, the clamp 30 includes a backing plate 50, a stationary clamping platform 54, a moveable clamping platform 58, and a locking mechanism 62. Each of the stationary clamping platform 54 and the moveable clamping platform 58 are coupled to the backing plate 50. The stationary clamping platform 54 is fixed relative to the backing plate 50 while the moveable clamping platform 58 is moveable relative to the backing plate 50 and the stationary clamping platform 54. As will be described in greater detail herein, the clamping platforms 54, 58 form opposing clamping surfaces that, when the bracket 14 is coupled to the desk 18, engage upper and lower surfaces of the desk 18 to clamp the desk 18 therebetween. The locking mechanism 62 selectively allows for adjustment of the moveable clamping platform 58 relative to the stationary clamping platform 54. In some embodiments, the bracket 14 includes a cable management clip 66 slidably coupled to the backing plate 50 to direct cables that are coupled to the connectivity module 10.

Figure 6:
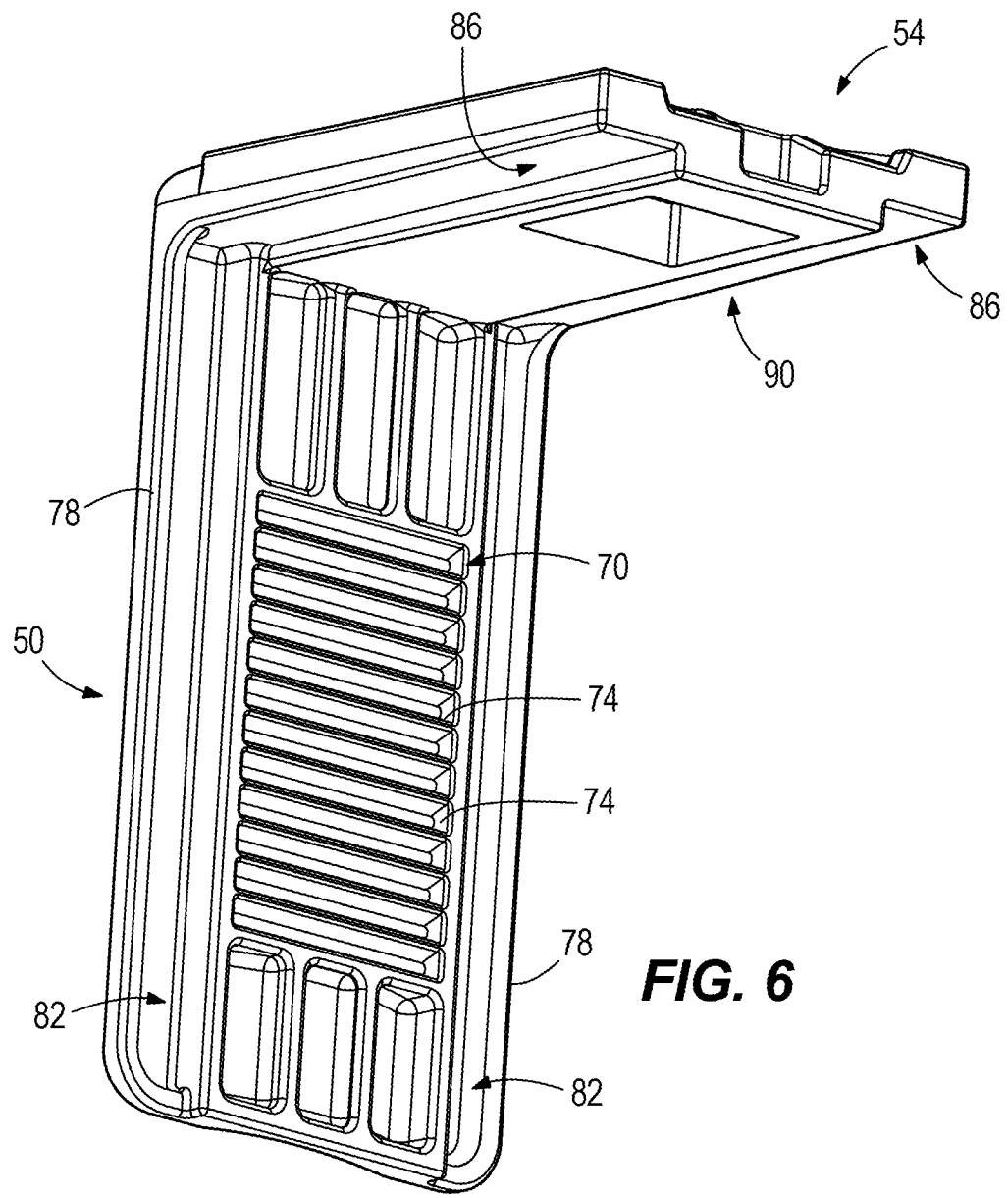
FIG. 6 is a perspective view of a backing plate and stationary clamping platform.

FIG. 6 illustrates the backing plate 50 and the stationary clamping platform 54 in detail. The backing plate 50 is generally rectangular in cross-section and is sized to have a length sufficiently longer than a depth (or thickness) of the desk 18 to which the bracket 14 is to be coupled. The backing plate 50 includes a centrally located rack 70 extending along a longitudinal direction of the backing plate 50. The rack 70 includes a plurality of gear teeth 74 that are selectively engageable by the locking mechanism 62. The backing plate 50 also includes side rails 78 extending along opposing longitudinal edges of the backing plate 50 to support the moveable clamping platform 58 relative to the backing plate 50. Adjacent each side rail 78 is a recess 82 to provide clearance for the moveable clamping platform 58 to be secured to the backing plate 50.

With reference to FIGS. 5 and 6, the stationary clamping platform 54 is integrally formed with the backing plate 50. More particularly, the stationary clamping platform 54 extends transversely from an end of the backing plate 50. The combination of the backing plate 50 and the stationary clamping platform 54 form a generally L-shaped structure, with the backing plate 50 forming a longer portion of the "L." In some embodiments, the stationary clamping platform 54 may be formed separately from the backing plate 50 and coupled to the backing plate 50 so long as the stationary clamping platform 54 and the backing plate 50 are transverse to one another. The stationary clamping platform 54 includes opposed longitudinal recesses 86 that engage with the attachment wings 46 of the holder 26 to secure the holder 26 to the stationary clamping platform 54. A stationary clamping surface 90 is formed by an interior portion of the stationary clamping platform 54. In other words, a surface 90 of the stationary clamping platform 54 that faces the moveable clamping platform 58 is generally flat to engage a portion of the desk 18 when the bracket 14 is coupled to a desk 18. In some embodiments, the stationary clamping surface 90 may include a pad 94 (FIG. 1) that is deformable to prevent marring of the desk 18 when the bracket 14 is clamped to the desk 18. In the illustrated embodiment, the pad 94 provides a high-friction surface to assist in securing the clamp 30 to the desk 18.

Figure 7:
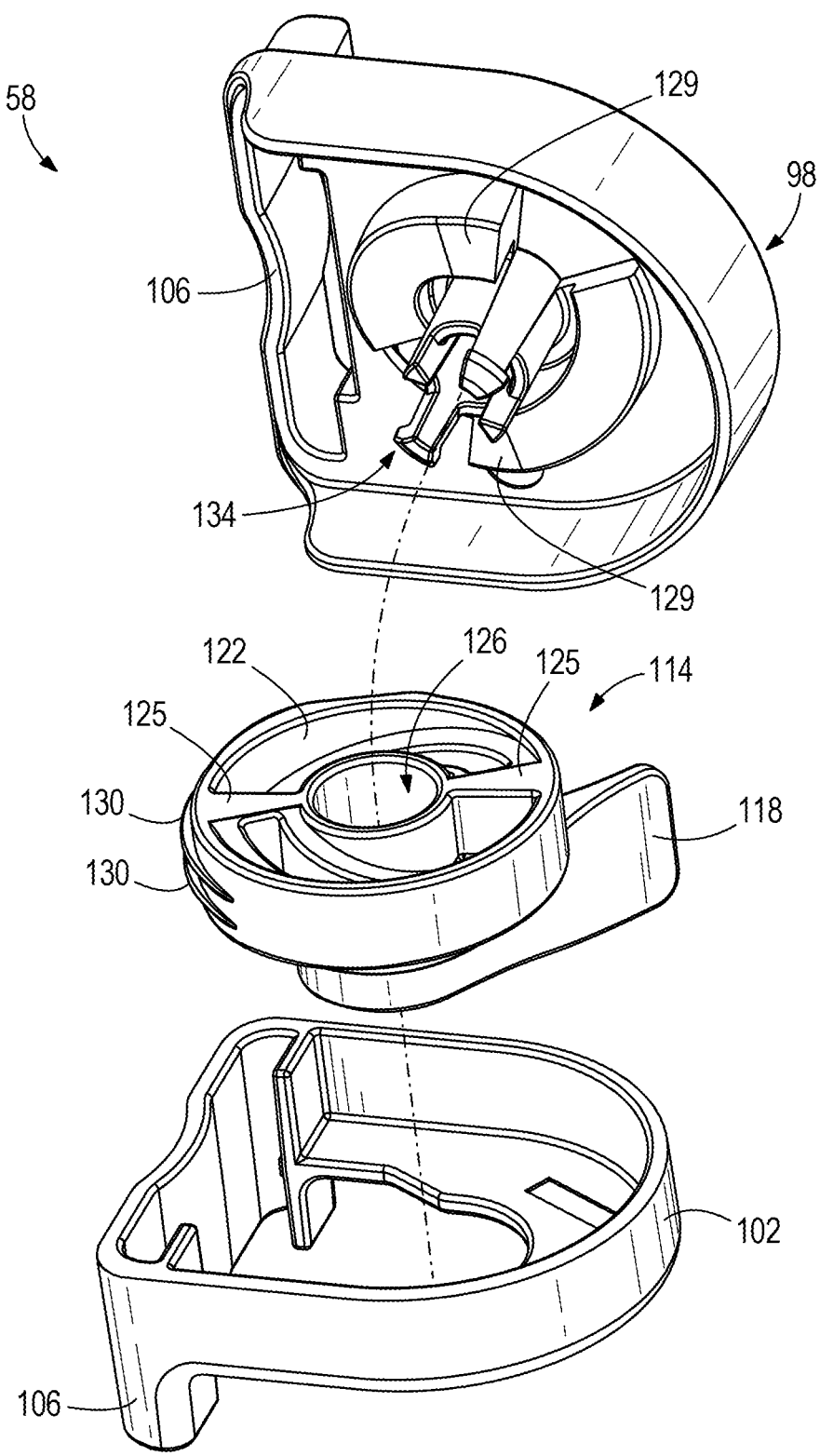
FIG. 7 is an exploded view of a moveable clamping platform.

With reference to FIGS. 5 and 7, the moveable clamping platform 58 includes a moveable clamping surface 98 and a slide support 102. In the illustrated embodiment, the slide support 102 nests inside of the moveable clamping surface 98. However, in other embodiments, the moveable clamping surface 98 may nest inside of the moveable clamping surface 98. The locking mechanism 62 is supported between the moveable clamping surface 98 and the slide support 102. The slide support 102 is coupled to the side rails 78 of the backing plate 50 and is slidable along the backing plate 50 to adjust a position of the moveable clamping platform 58. The moveable clamping surface 98 is also slidably coupled to the side rails 78 of the backing plate 50. Each of the moveable clamping surface 98 and the slide support 102 includes a slide strap 106, 108 that extends around the backing plate 50 to secure the moveable clamping platform 58 to the backing plate 50 while allowing sliding motion along the backing plate 50. The moveable clamping surface 98 and the slide support 102 are further coupled to one another to be co-moveable along the backing plate 50. The moveable clamping surface 98 forms an upper portion of the moveable clamping platform 58 while the slide support 102 forms a lower portion of the moveable clamping platform 58. The moveable clamping surface 98 is oriented opposite to the stationary clamping surface 90 to engage an opposite side of the desk 18 as the stationary clamping surface 90 when the bracket 14 is coupled to the desk 18. The moveable clamping surface 98 may be misaligned from the stationary clamping surface 90 (e.g., non-parallel) to account for deformation of the clamp 30. For example, the moveable clamping surface 98 may be positioned at an angle of between 1 and 5 degrees, and in particular 4 degrees relative to the stationary clamping surface 90. When the clamp 30 is secured to the desk 18, the clamp 30 will deform under the clamping force to align the moveable clamping surface 98 and the stationary clamping surface 90. Similar to the stationary clamping surface 90, in some embodiments the moveable clamping surface 98 may include a pad 110 that is deformable to prevent marring of the desk 18 when the bracket 14 is coupled to the desk 18. Similar to the pad 94, the pad 110 of the illustrated embodiment provides a high-friction surface to assist in securing the clamp 30 to the desk.

Figure 8:
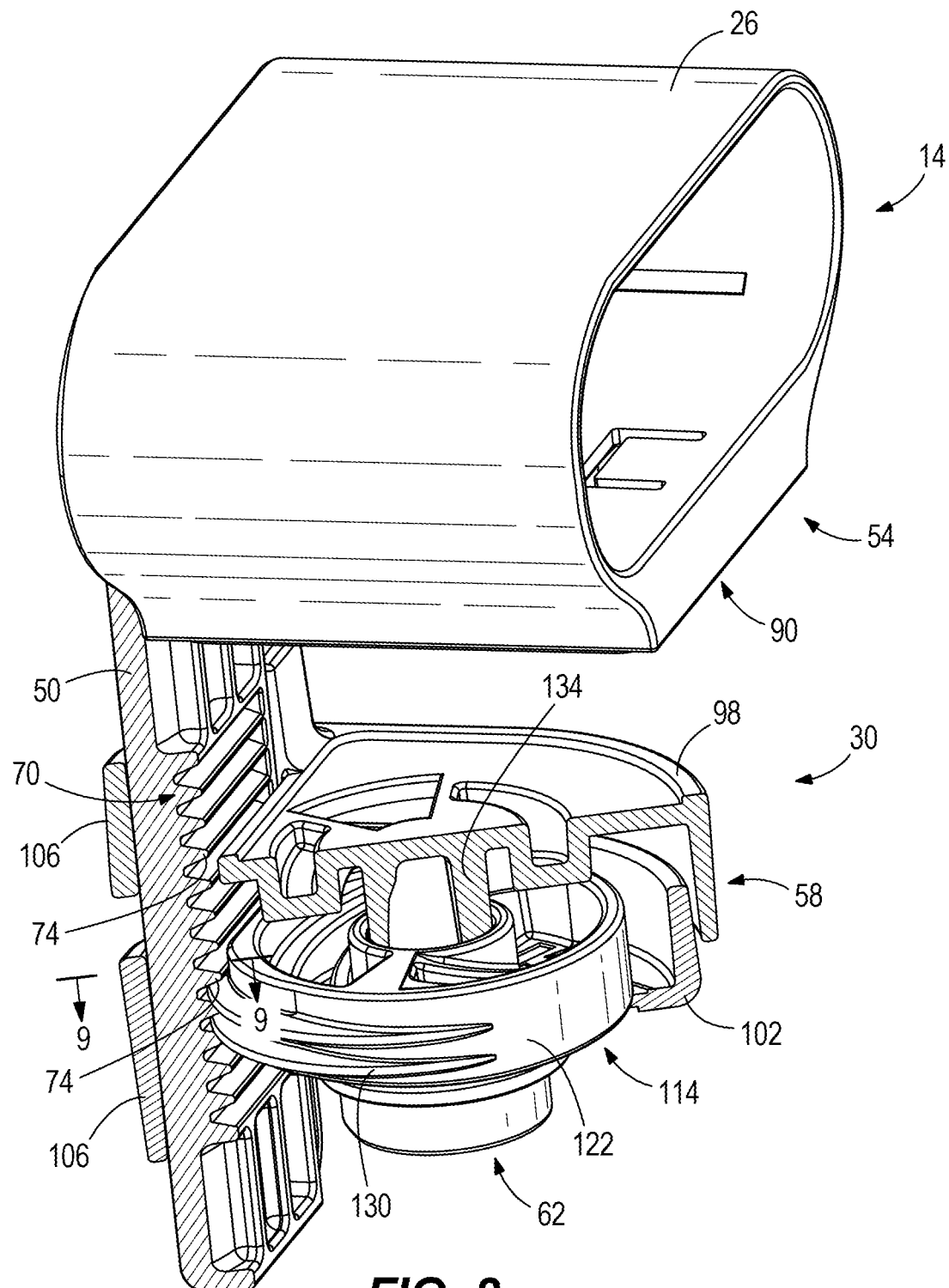
FIG. 8 is a cross-sectional view of the bracket, taken along section line 8-8 in FIG. 2.
Figure 9:
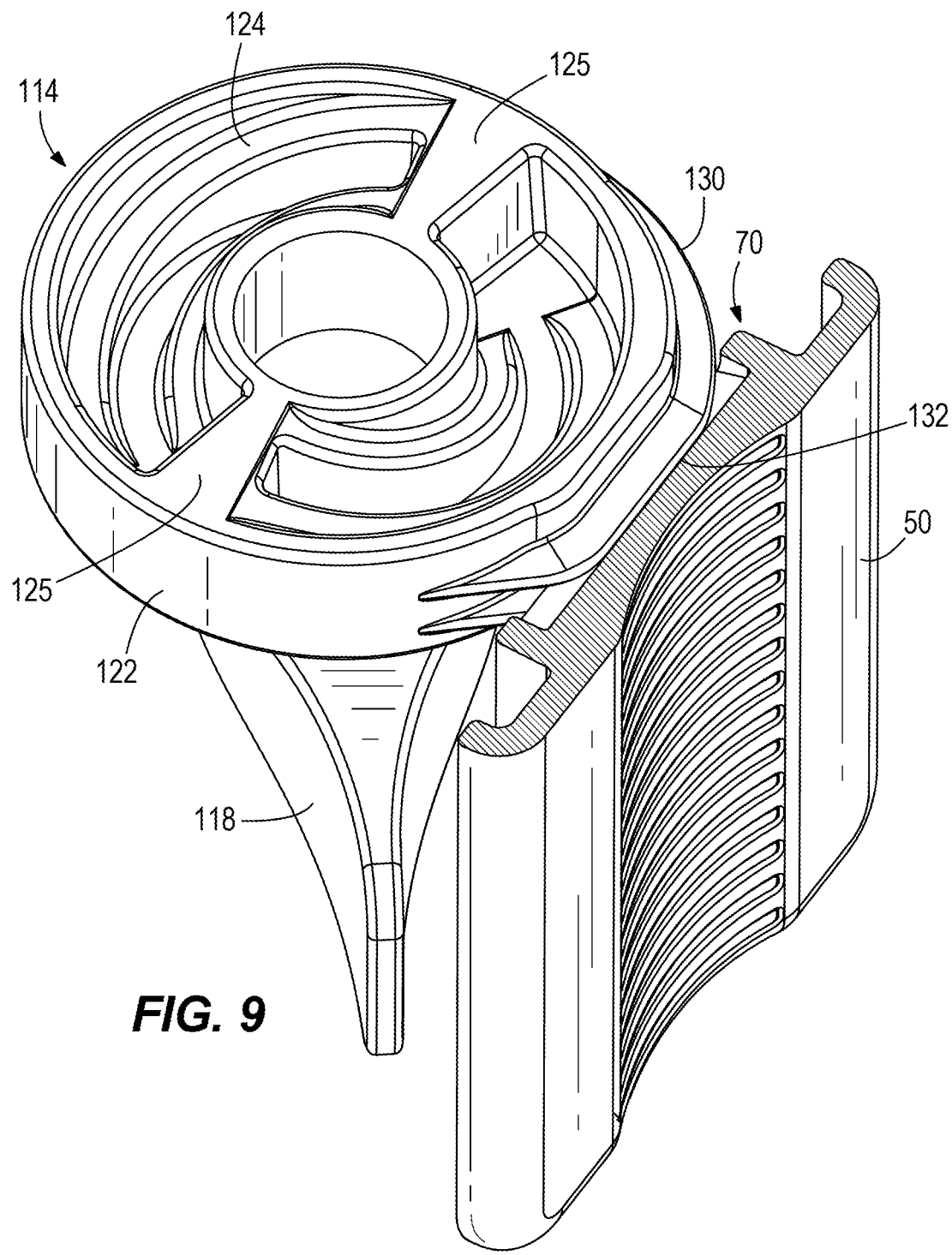
FIG. 9 is a partial cross-sectional view of the bracket, taken along section line 8a-8a in FIG. 8.

With reference to FIGS. 7 and 8, the locking mechanism 62 includes a generally cylindrical worm 114 and a cam handle 118 coupled to the worm 114. The worm 114 includes a worm body 122 having a central aperture 126 and a plurality of gear teeth 130 extending partially around a circumference of the worm body 122. In the illustrated embodiment, the worm 114 includes two gear teeth 130, however, in other embodiments, there may be fewer or a greater number of gear teeth 130. The plurality of gear teeth 130 are configured to selectively meshingly engage with the plurality of gear teeth 74 of the rack 70. The gear teeth 130 do not extend around the entire worm body 122, but rather, only extend around a portion of the circumference of the worm body 122. The portion of the worm body 122 including the plurality of gear teeth 130 forms the locking portion of the worm 114 while the portion of the worm body 122 without the gear teeth 130 forms the release portion of the worm 114. This allows the locking mechanism 62 to be rotated between a locked position, in which the moveable clamping platform 58 is secured relative to the backing plate 50, and a unlocked position, in which the gear teeth 130 are disengaged from the gear teeth 74 of the rack 70 and the moveable clamping platform 58 is moveable along the backing plate 50. With reference to FIG. 9, the gear teeth 130 of the worm body 122 include flat profiles 132 at the location that engages the rack 70 when the locking mechanism 62 is in the locked position. The flat profiles 132 are formed as a decrease in a radius of the gear teeth 130 to relieve pressure that is generated between the worm body 122 and the rack 70 as the worm body 122 is rotated. The flat profiles 132 further prevent unintentional rotation of the worm body 122 relative to the rack 70. When the locking mechanism 62 is in an unlocked position, the user may adjust the position of the moveable clamping platform 58 relative to the backing plate 50

The locking mechanism 62 is supported by the moveable clamping platform 58 and is disposed between the slide support 102 and the moveable clamping surface 98. The worm body 122 is supported above a platform 112 of the slide support 102, while the cam handle 118 extends below the platform 112 of the slide support 102. The worm body 122 is also supported by an axial protrusion 134 extending from a lower portion of the moveable clamping surface 98. The axial protrusion 134 is received within the central aperture 126 to couple the worm 114 to the moveable clamping platform 58. The worm 114 is axially secured to the moveable clamping platform 58 while being rotatable about the axial protrusion 134 relative to the moveable clamping platform 58.

In the illustrated embodiment, the cam handle 118 is coupled to the worm 114 and the cam handle 118 and the worm 114 are co-rotatable so that a user can induce rotation of the worm 114 by rotating the cam handle 118. The cam handle 118 extend from the worm 114 in a direction perpendicular to the axis of rotation of the worm 114. In the illustrated embodiment, the cam handle 118 extends outside of the moveable clamping platform 58 and is positioned below the slide support 102 so that it is accessible to a user to rotate. However, in other embodiments the position of the handle 118 may vary. The cam handle 118 is rotatable between a unlocked position and a locked position to actuate the locking mechanism 62. When the cam handle 118 is in the unlocked position, the gear teeth 130 of the worm 114 are not meshingly engaged with the rack 70. Therefore, in the unlocked position the moveable clamping platform 58 is free to slide along the backing plate 50. When the cam handle 118 is in the locked position, the gear teeth 130 of the worm 114 are meshingly engaged with the gear teeth 74 of the rack 70, thus securing the moveable clamping platform 58 relative to the backing plate 50. In some embodiments, the moveable clamping platform 58 may include indicia 120 corresponding to the unlocked and locked positions of the cam handle 118. Furthermore, in the illustrated embodiment, the cam handle 118 rotates less than a full revolution (i.e., less than 360 degree) between the unlocked position and the locked position. In other embodiments, the cam handle 118 may be rotatable more than a full revolution when rotating between the unlocked and locked positions.

In addition to the cam handle 118 locking and releasing the gear teeth 130 from the teeth 74 of the rack 70 to enable gross movement of the moveable clamping platform 58 along the backing plate 50, the cam handle 118 helps to create a clamping force between the moveable clamping platform 58 and the stationary platform 54. Referring to FIG. 7, the worm 114 includes one or more camming surface 124 that engage with one or more camming surface 128 on the moveable clamping surface 98. Rotation of the cam handle 118 rotates the worm 114 and enables the camming surfaces 124 of the worm 114 to cam against the camming surfaces 128 of the moveable clamping surface 98 and push the moveable clamping surface 98 towards the stationary platform 54. In the illustrated embodiment, the camming surfaces 124 include a flat area 125 that engages with a corresponding flat area 129 of the camming surfaces 128 when the cam handle 118 is rotated toward the locked position. The cam handle 118, and thus the locking mechanism 62, is in the locked position when the flat profiles 132 of the gear teeth 130 are engaged with the rack 70 and the flat area 125 is engaged with the flat area 129. Engagement between the flat areas 125, 129 serves to maintain the clamping force generated by rotation of the worm 114, and engagement between the flat profile 132 and the rack 70 prevents unintentional rotation of the worm body 122 relative to the rack 70. More specifically, the flat surfaces 125, 129 prevent the cam handle 118 from springing back into an unlocked position.

As shown in FIG. 10, the camming surfaces 124 and 128 drive the moveable clamping surface 98 upward and away from the slide support 102 to increase the clamping force applied to the desk 18 between the moveable clamping surface 98 and the stationary clamping surface 54. Additionally, due to the pitch of the gear teeth 130 of the worm 114, the moveable clamping platform 58 is driven towards the stationary clamping platform 54 as the worm 114 is rotated, thus applying a clamping force to the desk 18. Accordingly, the locking member 62 is responsible for locking/unlocking the moveable clamping platform 58 to enable gross movement of the moveable clamping platform 58 relative to the backing plate 50, as well as creating a clamping force between the moveable clamping platform 58 and the stationary clamping platform 54 via finer movement of the moveable clamping surface 98.

The locking member 62 is rotated between an unlocked position, in which the threads 130 are disengaged from the teeth 74 of the rack 70, and a locked position, in which the teeth 130 are engaged with the teeth 74 of the rack 70. As previously mentioned, the teeth 130 include a flat profile 132 that helps to relieve a build-up of pressure generated between the worm 114 and the rack 70. This also helps to maintain the locking member 62 in a locked position and helps to inhibit unintentional return of the cam handle 118 to an unlocked position with reduced clamping force.

Once in the locked position, the locking member 62 may rotated further within the locked position to increase the clamping force applied to the desk 18 by the moveable clamping surface 98. When the locking member 62 is fully rotated, the flat area 125 on the camming surface 124 engages with the corresponding flat area 129 on the camming surface 128 to lock the cam handle 118 in place and inhibit unintended rotation towards an unlocked position. As such the clamping force will be maintained.

FIG. 10 illustrates the cam handle 118 in different rotational positions. The bottom views illustrate the cam handle 118 in a locked position, in which the threads 130 are engaged with the rack 70, and an unlocked position, in which the threads 130 are disengaged from the rack 70. The side views illustrate the relative positions of the moveable clamping surface 98 and the slide support as the cam handle rotates 118. As the moveable clamping surface 98 is driven away from the slide support 102, a clamping force is generated between the moveable clamping platform 58 and the stationary clamping platform 54. Therefore, the initial rotation of the cam handle 118 serves to lock the moveable clamping platform 54 in place relative to the backing plate 50. Further rotation of the cam handle 118 within the locked position serves to continuously increase the clamping force applied to the desk 18 by the moveable clamping surface 98 and the stationary clamping platform 54.

To secure the bracket 14 to a desk 18, the holder 26 is first coupled to the bracket 14 by sliding the attachment wings 46 over the stationary clamping platform 54. The cam handle 118 is then rotated to the unlocked position to disengage the gear teeth 130 of the worm 114 from the gear teeth 74 of the rack 70. In this position, the moveable clamping platform 58 is freely slidable along the length of the backing plate 50 for gross movement of the moveable clamping platform 58. The moveable clamping platform 58 is then slid along the backing plate 50 to a position in which the moveable clamping surface 98 is spaced sufficiently from the stationary clamping surface 90 to receive the desk 18 therebetween, and the clamp 30 is placed on the desk 18. The user then slides the moveable clamping platform 58 towards the desk 18 until the moveable clamping surface 98 touches the desk 18. Finally, the user rotates the cam handle 118 toward the locked position. As the cam handle 118 and worm 114 rotate toward the locked position, the gear teeth 130 of the worm 114 meshingly engage with the gear teeth 74 of the rack 70 to secure the moveable clamping platform 58 to the backing plate 50. Additionally, rotation of the cam handle 118 also results in a clamping force between the moveable clamping platform 58 and the stationary clamping platform 54 by in finer movement of the moveable clamping surface 98 towards the stationary clamping platform 54 resulting from the interaction between the camming surfaces 124 and camming surfaces 128. When the cam handle 118 reaches the locked position, the flat profile 132 of the teeth 130 is engaged with the rack 70 to prevent unintentional rotation of the cam handle 118.

To remove the bracket 14 from the desk 18, the user rotates the cam handle 118 toward the unlocked position to disengage the gear teeth 130 of the worm 114 from the rack 70 and remove the clamping force from the desk 18. The moveable clamping platform 58 is then freely slidable along the backing plate 50 and the bracket 14 can be removed from the desk 18.

Although the disclosure has been described in detail with reference to certain preferred embodiments, variations and modifications exist within the scope and spirit of one or more independent aspects of the disclosure as described.

Various features and advantages of the disclosure are set forth in the following claims.

What is claimed is:

1. A bracket configured to selectively couple an accessory to a piece of furniture, the bracket comprising:
   a holder configured to support the accessory; and
   a clamp supporting the holder and configured to couple the accessory to the piece of furniture, the clamp including
   a backing plate including a rack having a plurality of teeth,
   a stationary clamping platform extending transverse to the backing plate,
   a moveable clamping platform coupled to the backing plate, the moveable clamping platform oriented transverse to the backing plate and moveable along the backing plate, and
   a locking mechanism operably coupled to the moveable clamping platform, the locking mechanism including a plurality of teeth configured to selectively meshingly engage with the teeth on the rack of the backing plate,
   wherein the locking mechanism is rotatable between a lock position, in which the gear teeth of the locking mechanism are engaged with the rack, and an unlock position, in which the gear teeth of the locking mechanism are disengaged from the rack,
   wherein the teeth of the locking mechanism extend circumferentially around on a body, and wherein the teeth extend around a portion of the body that is less than the entire circumference of the body.

2. The bracket of claim 1, wherein the moveable clamping platform includes a moveable clamping surface and a slide support, and wherein the body of the locking mechanism is supported between the moveable clamping surface and the slide support.

3. The bracket of claim 2, wherein the body of the locking mechanism includes a camming surface that is engagable with a camming surface on the moveable clamping surface, and wherein rotation of the locking mechanism drives the moveable clamping surface towards the stationary clamping platform to create a clamping force.

4. The bracket of claim 2, wherein the locking mechanism further includes a handle extending outside of the moveable clamping platform and is operable to rotate the body between the locked position and the unlocked position.

5. The bracket of claim 1, further comprising a cable management clip coupled the backing plate.

6. The bracket of claim 1, wherein the stationary clamping platform is integrally formed with the backing plate.

7. The bracket of claim 1, wherein the accessory is a connectivity module including a plurality of connectivity ports, and wherein the connectivity module is selectively received within an aperture formed by the holder.

8. A bracket configured to selectively couple an accessory to a piece of furniture, the bracket comprising:
   a backing plate including a rack extending along a longitudinal direction of the backing plate, the rack including a plurality of teeth;
   a stationary clamping platform extending from a first end of the backing plate in a direction transverse to the longitudinal direction of the backing plate;
   a moveable clamping platform oriented parallel to the stationary clamping platform, the moveable clamping platform coupled to the backing plate and selectively moveable along the longitudinal direction of the backing plate, the moveable clamping platform including a moveable clamping surface and a slide support; and a locking mechanism including a worm positioned between the moveable clamping surface and the slide support, the worm including a plurality of teeth selectively engagable with the plurality of teeth on the rack, the locking mechanism rotatable between a locked position, which inhibits movement of the moveable clamping platform relative to the backing plate, and an unlocked position, in which the moveable clamping platform is freely moveable relative to the backing plate, wherein the teeth of the locking mechanism extend circumferentially around a portion of the worm that is less than the entire circumference of the worm, and wherein the worm rotates less than a full revolution between the unlock position and the lock position.

9. The bracket of claim 8, wherein the locking mechanism includes a camming surface that is engagable with a camming surface on the moveable clamping surface, and wherein rotation of the locking mechanism drives the moveable clamping surface away from the slide support and towards the stationary clamping platform to create a clamping force.

10. The bracket of claim 9, and wherein the plurality of teeth include a flat portion that engages the rack to prevent unintentional rotation of the worm when the locking mechanism is in the locked position.

11. The bracket of claim 8, wherein the locking mechanism includes cam handle operably coupled to the worm and configured to control rotation of the worm, the cam handle extending in a direction perpendicular to an axis of rotation of the worm.

12. The bracket of claim 8, further comprising a connectivity module including a plurality of connectivity ports, the connectivity module supported by the stationary clamping platform.

13. The bracket of claim 12, further comprising a holding portion having an aperture for removably receiving the connectivity module.

14. The clamp of claim 8, wherein the backing plate includes a pair of longitudinally extending opposed side rails, and wherein the moveable clamping platform is coupled to the opposed side rails.

15. A bracket configured to selectively couple an accessory to a piece of furniture, the bracket comprising:

a backing plate including a pair of longitudinally extending opposed side rails and a rack having a plurality of teeth, the teeth extending between the pair of opposed side rails;

a stationary clamping platform fixedly coupled to the backing plate, the accessory supported by the stationary clamping platform;

a moveable clamping platform having a clamping surface oriented parallel to the clamping surface of the stationary clamping platform, the moveable clamping platform coupled to the opposed side rails to be selectively moveable along the backplate; and a locking mechanism supported by the moveable clamping platform and rotatable relative to the moveable clamping platform, the locking mechanism including a plurality of teeth configured to selectively meshingly engage with the rack, wherein moveable clamping platform includes a moveable clamping surface and a slide support, and wherein the locking mechanism is positioned between the moveable clamping surface and the slide support.

16. The bracket of claim 15, wherein the teeth of the locking mechanism extend circumferentially around a portion of the locking mechanism that is less than the entire circumference of the worm, and wherein the locking mechanism rotates less than a full revolution between the unlock position and the lock position.

17. The bracket of claim 15, the locking mechanism includes a camming surface that is engageable with a camming surface on the moveable clamping surface, and wherein rotation of the locking mechanism drives the moveable clamping surface away from the slide support and towards the stationary clamping platform to create a clamping force.

18. The bracket of claim 17, wherein the camming surface of the locking mechanism includes a flat area, wherein the camming surface of the moveable clamping platform includes a corresponding flat area, and wherein the flat areas are engaged to maintain the clamping force when the locking mechanism is in a locked position.

19. The bracket of claim 15, wherein the plurality of teeth include a portion having a flat profile, and wherein the flat profile is configured to engage the rack to prevent unintentional movement of the locking mechanism.

* * * * *